United States Patent
Davidson et al.

(10) Patent No.: US 9,388,258 B2
(45) Date of Patent: Jul. 12, 2016

(54) PHOSPHONIUM IONOMERS COMPRISING PENDANT VINYL GROUPS AND PROCESSES FOR PREPARING SAME

(75) Inventors: Gregory Davidson, London (CA); Dana Adkinson, London (CA); Sean Malmberg, London (CA); Lorenzo Ferrari, Brights Grove (CA); Conrad Siegers, London (CA); Sarah Chadder, London (CA)

(73) Assignee: LANXESS INTERNATIONAL SA, Granges-Paccot (CH)

( * ) Notice: Subject to any disclaimer, the term of this patent is extended or adjusted under 35 U.S.C. 154(b) by 0 days.

(21) Appl. No.: 13/885,196

(22) PCT Filed: Nov. 24, 2011

(86) PCT No.: PCT/CA2011/001297
§ 371 (c)(1),
(2), (4) Date: Nov. 4, 2013

(87) PCT Pub. No.: WO2012/083419
PCT Pub. Date: Jun. 28, 2012

(65) Prior Publication Data
US 2014/0051810 A1    Feb. 20, 2014

Related U.S. Application Data

(60) Provisional application No. 61/416,862, filed on Nov. 24, 2010.

(51) Int. Cl.
| | | |
|---|---|---|
| *C08F 210/12* | (2006.01) | |
| *C08F 8/40* | (2006.01) | |
| *C08J 3/24* | (2006.01) | |
| *C08F 212/08* | (2006.01) | |
| *C08F 236/20* | (2006.01) | |

(52) U.S. Cl.
CPC ............... *C08F 8/40* (2013.01); *C08F 210/12* (2013.01); *C08F 212/08* (2013.01); *C08F 236/20* (2013.01); *C08J 3/24* (2013.01); *C08J 3/243* (2013.01); *C08J 2323/22* (2013.01)

(58) Field of Classification Search
CPC .... C08F 210/12; C08F 212/08; C08F 236/20; C08F 8/40; C08J 3/24; C08J 3/243; C08J 2323/22
USPC ............... 525/242, 287, 326.1, 331.9, 332.3, 525/332.8, 333.4
See application file for complete search history.

(56) References Cited

U.S. PATENT DOCUMENTS

| 2,356,128 | A | | 8/1944 | Thomas et al. |
|---|---|---|---|---|
| 2,418,884 | A | | 4/1947 | Hoover |
| 4,525,446 | A | * | 6/1985 | Uytterhoeven et al. ........ 430/115 |
| 5,013,793 | A | | 5/1991 | Wang et al. |
| 5,162,445 | A | | 11/1992 | Powers et al. |
| 5,182,333 | A | | 1/1993 | Powers et al. |
| 5,578,682 | A | | 11/1996 | White |
| 5,654,379 | A | * | 8/1997 | Powers et al. .................. 525/356 |
| 5,753,764 | A | | 5/1998 | Boutevin et al. |
| 5,994,465 | A | | 11/1999 | Sudo et al. |
| 6,960,632 | B2 | | 11/2005 | Kaszas |
| 2007/0218296 | A1 | | 9/2007 | Resendes et al. |
| 2009/0018289 | A1 | | 1/2009 | Resendes et al. |
| 2009/0182095 | A1 | | 7/2009 | Resendes et al. |
| 2009/0299000 | A1 | * | 12/2009 | Resendes et al. ............. 524/576 |

FOREIGN PATENT DOCUMENTS

| CA | 2458741 A1 | 8/2005 | | |
|---|---|---|---|---|
| CA | 2578583 C | 9/2007 | | |
| JP | 06-107738 | 4/1994 | | |
| JP | 06-172547 | 6/1994 | | |
| WO | WO 9410214 A1 * | 5/1994 | ............... | C08F 8/40 |

OTHER PUBLICATIONS

Ciullo, P.A. Industrial Minerals and Their Uses—A Handbook and Formulary Willaim Andrew Publishing (1996) p. 207.*
Ullmann's Encyclopedia of Industrial Chemistry, vol. A23, 1993, SCH Verlag, Weinheim, Germany, pp. 288-295.
Morton, Maurice, Rubber Technology (Third Edition), Chapter 10, Van Nostrand Reinhold Company, 1987, New York, pp. 297-300.
Parent, et al., "Ion-Dipole INteraction Effects in Isobutylene-based Ammonium Bromide Ionomers", Journal of Polymer Science: Part A: Polymer Chemistry, vol. 43, 2005, Wiley Periodicals, Inc., Hoboken, NJ, pp. 5671-5679.
Parent, et al., "Isobutylene-based ionomer composites: siliceous filler reinforcement", Polymer 45, 2004, Elsevier, Amsterdam, The Netherlands, pp. 8091-8096.
Parent, et al., "Synthesis and Characterization of Isobutylene-Based Ammonium and Phosphonium Bromide Ionomers", Macromolecules 2004, 37, American Chemical Society, Washington DC, pp. 7477-7483.
Encyclopedia of Polymer Science and Engineering, vol. 4, "Compounding", 1986, John Wiley & Sons, New York, NY, pp. 66-79.
International Search Report for related international application PCT/CA2011/001297, Feb. 8, 2012, 2 pages.

* cited by examiner

*Primary Examiner* — Irina S Zemel
*Assistant Examiner* — Jeffrey Lenihan

(57) ABSTRACT

The present invention relates to ionomers comprising a reaction product of the reaction between a halogenated isoolefin copolymer and at least one phosphorus based nucleophile comprising at least one pendant vinyl group. The present invention also relates to a method of preparing and curing these ionomers.

42 Claims, No Drawings

PHOSPHONIUM IONOMERS COMPRISING PENDANT VINYL GROUPS AND PROCESSES FOR PREPARING SAME

FIELD OF THE INVENTION

The present invention relates to curable butyl rubber derivatives. In particular, the present invention relates to ionomers comprising at least one pendant vinyl group.

BACKGROUND

Poly(isobutylene-co-isoprene) or IIR, is a synthetic elastomer commonly known as butyl rubber (or Butyl polymer) which has been prepared since the 1940's through the random cationic copolymerization of isobutylene with small amounts of isoprene (usually not more than 2.5 mol %). As a result of its molecular structure, IIR possesses superior air impermeability, a high loss modulus, oxidative stability and extended fatigue resistance.

Butyl rubber is understood to be a copolymer of an isoolefin and one or more, preferably conjugated, multiolefins as comonomers. Commercial butyl comprises a major portion of isoolefin and a minor amount, usually not more than 2.5 mol %, of a conjugated multiolefin. Butyl rubber or butyl polymer is generally prepared in a slurry process using methyl chloride as a diluent and a Friedel-Crafts catalyst as part of the polymerization initiator. This process is further described in U.S. Pat. No. 2,356,128 and Ullmanns Encyclopedia of Industrial Chemistry, volume A 23, 1993, pages 288-295.

Halogenation of this butyl rubber produces reactive allylic halide functionality within the elastomer. Conventional butyl rubber halogenation processes are described in, for example, Ullmann's Encyclopedia of Industrial Chemistry (Fifth, Completely Revised Edition, Volume A231 Editors Elvers, et al.) and/or "Rubber Technology" (Third Edition) by Maurice Morton, Chapter 10 (Van Nostrand Reinhold Company© 1987), particularly pp. 297-300.

The development of halogenated butyl rubber (halobutyl) has greatly extended the usefulness of butyl by providing much higher curing rates and enabling co-vulcanization with general purpose rubbers such as natural rubber and styrene-butadiene rubber (SBR). Butyl rubber and halobutyl rubber are high value polymers, as their unique combination of properties (excellent impermeability, good flex, good weatherability, co-vulcanization with high unsaturation rubbers, in the case of halobutyl) make them preferred materials for various applications, such as their use in making tire inner tubes and tire inner liners.

The presence of allylic halide functionalities allows for nucleophilic alkylation reactions. It has been recently shown that treatment of brominated butyl rubber (BIIR) with nitrogen and/or phosphorus based nucleophiles, in the solid state, leads to the generation of IIR-based ionomers with interesting physical and chemical properties (see: Parent, J. S.; Liskova, A.; Whitney, R. A; Resendes, R. *Journal of Polymer Science, Part A*: Polymer Chemistry 43, 5671-5679, 2005; Parent, J. S.; Liskova, A.; Resendes, R. *Polymer* 45, 8091-8096, 2004; Parent, J. S.; Penciu, A.; Guillen-Castellanos, S. A.; Liskova, A.; Whitney, R. A. *Macromolecules* 37, 7477-7483, 2004). The ionomer functionality is generated from the reaction of a nitrogen or phosphorous based nucleophile and the allylic halide sites in the halogenated butyl rubber to produce an ammonium or phosphonium ionic group respectively.

Like other rubbers, for most applications, butyl rubber must be compounded and vulcanized (chemically cross-linked) to yield useful, durable end use products. Grades of butyl rubber have been developed to meet specific processing and property needs, and a range of molecular weights, unsaturation, and cure rates. Both the end use attributes and the processing equipment are important in determining the right grade of butyl rubber to use in a specific application. The selection and ratios of the proper fillers, processing aids, stabilizers, and curatives also play critical roles in both how the compound will process and how the end product will behave.

Peroxide curable butyl rubber compounds offer several advantages over conventional sulfur-curing systems. Typically, these compounds display extremely fast cure rates and the resulting cured articles tend to possess excellent heat resistance. In addition, peroxide-curable formulations are considered to be "clean" in that they do not contain any extractable inorganic impurities (e.g., sulfur). The clean rubber articles can therefore be used, for example, in condenser caps, biomedical devices, pharmaceutical devices (stoppers in medicine-containing vials, plungers in syringes) and possibly in seals for fuel cells.

One approach for obtaining a peroxide-curable butyl-based formulation lies in the use of conventional butyl rubber in conjunction with a vinyl aromatic compound like divinylbenzene (DVB) and an organic peroxide (see Japanese Publication No. 06-107738). In place of DVB, an electron-withdrawing group-containing polyfunctional monomer (ethylene dimethacrylate, trimethylolpropane triacrylate, N,N'-m-phenylene dimaleimide) can also be used (Japanese Publication No. 06-172547).

A commercially available terpolymer based on isobutylene (IB), isoprene (IP) and DVB, XL-10000, is curable with peroxides alone. However, this material does possess some significant disadvantages. For example, the presence of significant levels of free DVB can present safety concerns. In addition, since the DVB is incorporated during the polymerization process a significant amount of crosslinking occurs during manufacturing. The resulting high Mooney (60-75 MU, ML1+8@125° C.) and presence of gel particles make this material extremely difficult to process. For these reasons, it would be desirable to have an isobutylene based polymer which is peroxide curable, completely soluble (i.e., gel free) and contains no, or trace amounts of divinylbenzene in its composition.

U.S. Pat. No. 5,578,682 discloses a process for obtaining a polymer with a bimodal molecular weight distribution derived from a polymer that originally possessed a monomodal molecular weight distribution. The polymer, e.g., polyisobutylene, a butyl rubber or a copolymer of isobutylene and para-methylstyrene, was mixed with a polyunsaturated crosslinking agent (and, optionally, a free radical initiator) and subjected to high shearing mixing conditions in the presence of organic peroxide. This bimodalization was a consequence of the coupling of some of the free-radical degraded polymer chains at the unsaturation present in the crosslinking co-agent.

Sudo et. al. (U.S. Pat. No. 5,994,465) discloses a method for curing regular butyl, with isoprene contents ranging from 0.5 to 2.5 mol %, by treatment with a peroxide and a bismaleimide species. Canadian Patent No. 2,418,884 and Canadian Patent Application No. 2,458,741 describe the preparation of butyl-based, peroxide-curable compounds which have high multiolefin content. Specifically, CA 2,418,884 describes the continuous preparation of HR with isoprene levels ranging from 3 to 8 mol %. The elevated level of isoprene in the polymer backbone renders these compounds peroxide curable. Halogenation of this high multiolefin butyl rubber consumes some of this unsaturation and produces a reactive allylic halide functionality within the elastomer. With these elevated levels of isoprene, it is possible to generate BIIR analogues which contain allylic bromide functionalities ranging from 3 to 8 mol %, often with residual double bonds in the polymer backbone. Nucleophilic substitution reactions as described above can be used to create ionomeric moieties from these allylic halide sites, with the residual unsaturation being sufficient to permit peroxide curing. Peroxide curable butyl rubber ionomer compositions with elevated levels of isoprene are described PCT Publication Nos. WO2007/022618 and WO2007/022619.

However, production of the starting butyl rubber with high isoprene content can be economically disadvantageous in a continuous production environment, due to the need to transition between grades. It would therefore be desirable to have a peroxide curable butyl rubber ionomer composition based on standard grades of butyl rubber with multiolefin content of 2.5 mol % or less. The physical and dynamic properties of the low isoprene content peroxide cured butyl compounds and halobutyl compounds generally are poor.

It would therefore be desirable to provide self curable or peroxide ionomer compositions which do not require elevated levels of multiolefins.

SUMMARY OF THE INVENTION

It is an object of the present invention to provide peroxide curable ionomers comprising at least one pendant vinyl group. In accordance with an aspect of the present invention there is provided a ionomer comprising a reaction product of the reaction between a halogenated isoolefin copolymer and at least one phosphorus based nucleophile comprising at least one pendant vinyl group.

In accordance with a aspect of the present invention there is provided a process for preparing an ionomer comprising the steps of providing a halogenated isoolefin copolymer; providing at least one phosphorus based nucleophile comprising at least one pendant vinyl group; and
reacting the halogen moiety of the halogenated copolymer with the nucleophile to form the ionomer.

In accordance with a aspect of the present invention there is provided a process for preparing a cured polymer, which involves process for preparing a cured polymer, which comprises the steps of providing a halogenated isoolefin copolymer; providing at least one phosphorus based nucleophile comprising at least one pendant vinyl group; reacting the halogen moiety of the halogenated copolymer with the nucleophile to form an ionomer; and
curing the ionomer by heating at a suitable curing temperature.

DETAILED DESCRIPTION

The present invention relates to novel ionomers, processes for preparing these ionomers and processes for curing these ionomers.
Ionomer
The ionomers of the present invention are obtained by reacting a halogenated isoolefin copolymer with a nucleophile comprising a pendant vinyl group.
Halogenated Copolymers
The halogenated copolymers used in the present invention are copolymers of at least one isoolefin monomer and one or more multiolefin monomers or one or more alkyl substituted aromatic vinyl monomers or both.

The isoolefins suitable for use in the present inventions are hydrocarbon monomers having 4 to 16 carbon atoms. In one embodiment of the present invention, isoolefins have from 4-7 carbon atoms. Examples of isoolefins for use in the present invention include isobutene (isobutylene), 2-methyl-1-butene, 3-methyl-1-butene, 2-methyl-2-butene, 4-methyl-1-pentene, 4-methyl-1-pentene and mixtures. In one embodiment, the isoolefin is isobutene (isobutylene).

Multiolefins copolymerizable with the isoolefins, as known to one skilled in the art, can be used in the practice of the present invention. In one embodiment, multiolefin monomers are conjugated dienes. Examples of such multiolefins include, for example, those having in the range of from 4-14 carbon atoms. Examples of suitable multiolefins include isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 4-butyl-1,3-pentadiene, 2,3-dimethyl-1,3-pentadiene, 2,3-dibutyl-1,3-pentadiene, 2-ethyl-1,3-pentadiene, 2-ethyl-1,3-butadiene, 2-methyl-1,6-heptadiene, cyclopentadiene, methylcyclopentadiene, cyclohexadiene, 1-vinyl-cyclohexadiene and mixtures thereof. In one embodiment, the conjugated diene is isoprene.

Alkyl substituted vinyl aromatic monomers useful in the present invention can have an aromatic group such as benzene, naphthalene, anthracene, phenanthrene or biphenyl. In one embodiment, the alkyl-substituted vinyl aromatic monomer is a $C_1$-$C_4$ alkyl substituted styrene. In one embodiment, $C_1$-$C_4$ alkyl substituted styrene includes, for example, o-methyl styrene, p-methyl styrene, or m-methyl styrene.

In one embodiment, the halogenated copolymer used in the formation of the ionomer of the present invention comprises at least one allylic halogen moiety, or at least one halo alkyl moiety or both.

In one embodiment, the halogenated copolymer comprises repeating units derived from at least one isoolefin monomer and repeating units derived from one or more multiolefin monomers. In such an embodiment, one or more of the repeating units derived from the multiolefin monomers comprise an allylic halogen moiety.

In one embodiment, the halogenated copolymer is obtained by first preparing a copolymer from a monomer mixture comprising one or more isoolefins and one or more multiolefins (also referred to as multiolefin butyl rubber polymer), followed by subjecting the resulting copolymer to a halogenation process to form the halogenated copolymer. Halogenation can be performed according to the process known by those skilled in the art, for example, the procedures described in Rubber Technology, 3rd Ed., Edited by Maurice Morton, Kluwer Academic Publishers, pp. 297-300 and further documents cited therein.

During halogenation, some or all of the multiolefin content of the copolymer is converted to units comprising allylic halides. The total allylic halide content of the halogentaed polymer cannot exceed the starting multiolefin content of the parent copolymer.

In one embodiment, the monomer mixture used in preparing the multiolefin butyl rubber comprises from about 80% to about 99.5% by weight of at least one isoolefin monomer and from about 0.5% to about 20% by weight of at least one multiolefin monomer. In one embodiment, the monomer mixture comprises from about 83% to about 98% by weight of at least one isoolefin monomer and from about 2.0% to about 17% by weight of a multiolefin monomer.

In one embodiment, the multiolefin butyl polymer comprises at least 0.5 mol % repeating units derived from the multiolefin monomers. In one embodiment, the repeating units derived from the multiolefin monomers are at least 0.75 mol %. In one embodiment, the repeating units derived from the multiolefin monomers are at least 1.0 mol %. In one embodiment, the repeating units derived from the multiolefin monomers are at least 1.5 mol %. In one embodiment, the repeating units derived from the multiolefin monomers are at least 2.0 mol %. In one embodiment, the repeating units derived from the multiolefin monomers are at least 2.5 mol %.

In one embodiment, the multiolefin butyl polymer comprises at least 3.0 mol % repeating units derived from the multiolefin monomers. In one embodiment, the repeating units derived from the multiolefin monomers are at least 4.0 mol %. In one embodiment, the repeating units derived from the multiolefin monomers are at least 5.0 mol %. In one embodiment, the repeating units derived from the multiolefin monomers are at least 6.0 mol %. In one embodiment, the repeating units derived from the multiolefin monomers at least 7.0 mol %.

In one embodiment, the repeating units derived from the multiolefin monomers are from about 0.5 mol % to about 20 mol %. In one embodiment, the repeating units derived from the multiolefin monomers are from about 0.5 mol % to about 8 mol %. In one embodiment, the repeating units derived from the multiolefin monomers are from about 0.5 mol % to about 4 mol %. In one embodiment, the repeating units derived from the multiolefin monomers are from about 0.5 mol % to about 2.5 mol %.

In one embodiment, the halogenated copolymer for use in the present invention includes a halogenated butyl rubber formed from isobutylene and less than 2.2 mol % isoprene, which is commercially available from LANXESS Deutschland GmbH and sold under the names Bromobutyl 2030™, Bromobutyl 2040™, Bromobutyl X2™.

In one embodiment, the halogenated copolymer for use in the present invention includes a high isoprene halogenated butyl rubber formed from isobutylene and at least 3 mole % isoprene or at least 4% isoprene, as described in Canadian Patent Application No. 2,578,583 and 2,418,884, respectively, which are incorporated herein by reference in their entirety.

In one embodiment, the halogenated copolymer of the present invention comprises copolymers of at least one isoolefin and one or more alkyl substituted aromatic vinyl monomers. In such an embodiment, one or more of the repeating units derived from the aromatic vinyl monomers comprise a halo alkyl moiety.

In one embodiment, these type of halogenated copolymers are obtained by first preparing a copolymer from a monomer mixture comprising one or more isoolefins and one or more alkyl substituted aromatic vinyl monomers, followed by subjecting the resulting copolymer to a halogentation process to form the halogenated copolymer. During halogenation, some or all of the alkyl groups of the repeating units derived from the aromatic vinyl monomers are halogenated.

In one embodiment, the halogenated copolymers of the present invention comprise co-polymers of isoolefin and methyl styrene, wherein after halogenations, methyl group of some or all of the repeating units derived from the methyl styrene are converted to benzylic halides. The total benzylic halide content of the halobutyl polymer cannot exceed the starting styrenic content of the parent butyl compound.

In one embodiment, the copolymers of isoolefins monomers and alkyl aromatic vinyl monomers comprise repeating units derived from the alkyl aromatic vinyl moieties from about 0.5 weight percent to about 25 weight percent of the copolymer. In one embodiment, the alkyl aromatic repeating units are from about 1 to about 20 weight percent. In one embodiment, the alkyl aromatic repeating units are from about 2 to about 10 weight percent.

In one embodiment, the halogenated copolymer of the present invention comprises copolymers of isobutylene and p-methyl styrene, as described in U.S. Pat. No. 5,013,793, which is incorporated herein by reference in its entirety. In one embodiment, the halogenated copolymer of the present invention comprises copolymers of isobutylene and p-methyl styrene having styrene content from about 5% to 7% and halogen content from about 0.5 to 1.5%.

In one embodiment, the halogenated copolymer of the present invention comprises copolymers of at least one isoolefin, one or more multiolefin monomers, and one or more alkyl substituted aromatic vinyl monomers. In such an embodiment, one or more units derived from the multiolefin monomers comprise an allylic halogen moiety and/or one or more units derived from the substituted aromatic vinyl monomers comprise a halo alkyl moiety.

These type of halogenated copolymers can be formed by first preparing a copolymer from a monomer mixture comprising the isoolefin, the multiolefin and the alkyl substituted aromatic vinyl monomers, followed by subjecting the resulting copolymer to halogenation process to halogenate the repeating units derived from the multiolefin monomers and/or the alkyl group of the repeating units derived from aromatic vinyl monomers.

In one embodiment, the monomer mixture used in preparing the copolymer of iosoolefin, the multiolefin and the alkyl substituted aromatic vinyl monomers comprise from about 80% to about 99% by weight of isoolefin monomers, from about 0.5% to about 5% by weight the multiolefin monomers, and from about 0.5% to about 15% by weight of the alkyl substituted aromatic vinyl monomers. In one embodiment, the monomer mixture comprises from about 85% to about 99% by weight of isoolefin monomer, from about 0.5% to about 5% by weight the multiolefin monomer and from about 0.5% to about 10% by weight alkyl substituted aromatic vinyl monomer.

In one embodiment, the halogenated copolymer comprises terpolymers of isobutylene, isoprene, and p-methyl styrene as described in U.S. Pat. No. 6,960,632, which is incorporated herein by reference in its entirety.

The mixture used to produce multiolefin butyl rubber polymer may further comprise a multiolefin cross-linking agent. The term cross-linking agent is a term known to persons skilled in the art and is understood to denote a compound that causes chemical cross-linking between the polymer chains as opposed to a monomer that will add to the chain. Examples of suitable cross-linking agents include norbornadiene, 2-isopropenylnorbornene, 2-vinyl-norbornene, 1,3,5-hexatriene, 2-phenyl-1,3-butadiene, divinylbenzene, diisopropenylbenzene, divinyltoluene, divinylxylene and $C_1$ to $C_{20}$ alkyl-substituted derivatives thereof. More preferably, the multiolefin crosslinking agent is divinyl-benzene, diisopropenylbenzene, divinyltoluene, divinyl-xylene and $C_1$ to $C_{20}$ alkyl-substituted derivatives thereof, and/or mixtures of the compounds given. Most preferably, the multiolefin cross-linking agent comprises divinyl-benzene and diisopropenylbenzene.

In one embodiment, the halogenated copolymers of the present invention is a star branched polymer comprising a branching moiety.

In one embodiment, the branching moiety is a polymeric branching moiety.

The polymeric branching moiety useful in the formation of the star branched polymer of the present invention includes polymers and copolymers comprising functional groups capable of copolymerizing or forming a covalent bond with the polymeric chain of the copolymer used in the formation of the halogenated copolymer. The functional group comprises cationically active unsaturation. Non-limiting examples of such polymeric moieties include polydienes, partially hydrogenated polydienes, such as polybutadiene, polyisoprene, polypiperylene, natural rubber, styrene-butadiene rubber, ethylene-propylene diene monomer rubber, styrene-butadiene-styrene and styrene-isoprene-styrene block copolymers.

Star branched polymers of the present invention can be prepared by first linking the polymeric chains with the branching moiety followed by halogenations of the polymeric chains. Preparation of starch branch polymers is described in U.S. Pat. No. 5,182,333 and European Publication No., 0 320 263, which are incorporated herein by reference in their entirety.

Nucleophiles

The nucleophiles for use in the preparation of the ionomer of the present invention comprise at least one pendent vinyl group.

In one embodiment, the nucleophile for use in the present invention includes a phosphorus based nucleophile having at least one pendant vinyl group.

In one embodiment, the nucleophile of the present invention has the following structural formula (I):

wherein:

A is phosphorus; and $R_1$, $R_2$ and $R_3$ are independently:

a linear or branched $C_1$-$C_{18}$ alkyl group optionally comprising one or more hetero atoms, one or more carbonyl groups or combinations thereof; $C_6$ to $C_{10}$ aryl; $C_3$-$C_6$ heteroaryl; $C_3$-$C_6$ cycloalkyl; $C_3$-$C_6$ heterocycloalkyl; or combinations thereof; wherein at least one of $R_1$, $R_2$ and $R_3$ contains a pendant vinyl group.

In one embodiment, in the structural formula (I), at least one of $R_1$, $R_2$ and $R_3$ is a linear or branched $C_1$-$C_{18}$ alkyl group or $C_6$ to $C_{10}$ aryl; $C_3$-$C_6$ heteroaryl; $C_3$-$C_6$ cycloalkyl; $C_3$-$C_6$ heterocycloalkyl optionally substituted with —C(O)—C(=CH$_2$)R$_4$, or —C(O)R$_4$, wherein R$_4$ is C1-C6 alkyl or H.

In one embodiment, in the structural formula (I), at least one of $R_1$, $R_2$ and $R_3$ is a linear or branched $C_1$-$C_{18}$ alkyl group or $C_6$ to $C_{10}$ aryl; optionally substituted with —C(O)—C(=CR'R")R$_4$, or —C(O)R$_4$, wherein R', R" and R$_4$ are independently C1-C6 alkyl or H.

In one embodiment, in the structural formula (I), at least one of $R_1$, $R_2$ and $R_3$ is —C(O)—C(=CH$_2$)R$_4$, or —C(O)R$_4$, wherein R$_4$ is C1-C6 alkyl or H.

In one embodiment, at least one of $R_1$, $R_2$ and $R_3$ is linear or branched $C_1$-$C_{18}$ alkyl group having a pendent vinyl group represent by the formula —CH=CH$_2$.

In one embodiment, in the structural formula (I), at least one of $R_1$, $R_2$ and $R_3$ is a $C_6$ to $C_{10}$ aryl substituted with a pendent vinyl group or substituted with a linear or branched $C_1$-$C_{18}$ alkyl group having a pendant vinyl group, wherein the pendant vinyl group is represented by the formula —CH=CH$_2$.

In one embodiment, the one or more heteroatom in the formula (I) is selected from N or O.

In general, the appropriate nucleophile will contain at least one neutral phosphorus center which possesses a lone pair of electrons which is both electronically and sterically accessible for participation in nucleophilic substitution reactions. Suitable nucleophiles include, but are not limited to diphenylphosphinostyrene (DPPS), allyldiphenylphosphine, diallylphenylphosphine, diphenylvinylphosphine, triallylphosphine, or mixtures thereof.

In one embodiment, the nucleophile for use with the present invention is diphenylphosphinostyrene (DPPS), shown below.

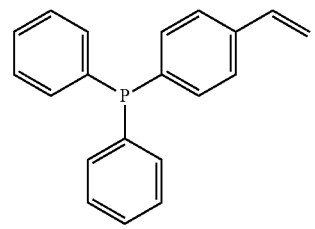 [SMILES: C=Cc1ccc(P(c2ccccc2)c2ccccc2)cc1]

Preparation of Ionomers

The ionomers of the present invention are prepared by reacting the halogen moieties of the halogenated copolymers as described above with the phosphorous nucleophile comprising a pendant vinyl group as also discussed above.

In one embodiment, when the nucleophile is reacted with halogenated copolymers containing halo groups such as allylic halides produced at the multiolefin sites of the starting polymer or alkyl halides produced at the aromatic vinyl sites of the starting polymer, the reaction product produces an ionomer having unsaturation at the pendant vinyl sites. This unsaturation is in addition to any residual unsaturation remaining in the halogenated copolymer starting material. Unsaturation allows self and peroxide curability of the ionomer, without the molecular weight degradation and chain scission that normally occurs when insufficient olefinic bonds are present.

An exemplary ionomer obtained by the reaction of halobutyl rubber with DPPS is shown below:

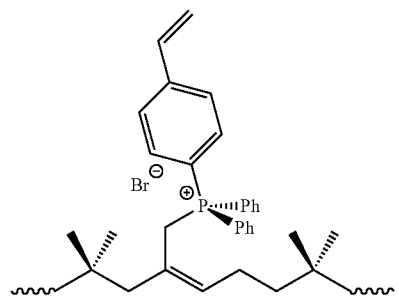

The amount of nucleophile reacted with the halogenated copolymer can be in the range of from about 0.05 to about 5 molar equivalents. In one embodiment, the amount of nucleophile is from about 0.5 to about 4 molar equivalents. In one embodiment, the amount of nucleophile is from about 1 to about 3 molar equivalents based on the total molar amount of halogen present in the halogenated copolymer.

The halogenated copolymer and the nucleophile can be reacted for about 0.20 to 90 minutes. When the reaction takes place in internal mixer the reagents are reacted from 1 to 10 minutes, or from 1 to 4 minutes. In other cases, the reaction takes considerably longer, for example from 15 to 90 minutes, or 20 to 60 minutes.

Since the nucleophile reacts with the halide functionality of the halogenated copolymer, the resulting ionomeric moiety is a repeating unit derived from the repeating units comprising the halide functionality. The total content of ionomeric moiety in the ionomer therefore cannot exceed the starting amount of halide in the halogenated copolymer; however, residual halides containing repeating units and/or residual unsaturated repeating units from the multiolefin and/or vinyl aromatic monomers may be present. In one embodiment, the resulting ionomer comprises from at least 0.05 mol % of the ionomeric moiety up to an amount not exceeding the original halide content of the halogenated copolymer used to produce the ionomer. Residual halides may be present in the ionomer in a non-zero amount up to an amount not exceeding the original halide content of the halogenated copolymer used to produce the ionomer. Residual multiolefin may be present in a non-zero amount up to an amount not exceeding the original multiolefin content of the starting polymer used to produce the halogenated copolymer.

In one embodiment, the ionomer comprises total unsaturation of the halogentaed copolymer and the pendant vinyl group in an amount greater than or equal to 1.0 mol %.

In one embodiment, the ionomer comprises total unsaturation of the butyl rubber and the pendant vinyl group in an amount greater than or equal to 1.0 mol %.

Fillers can also be used in the formation of the ionomers of the present invention. Fillers suitable for use in the present invention may be composed of particles of a mineral; suitable fillers include silica, silicates, clay (such as bentonite), gypsum, alumina, titanium dioxide, talc and the like, as well as mixtures thereof. Mineral fillers can also be used alone or in combination with known non-mineral fillers, such as carbon blacks; suitable carbon blacks can prepared by the lamp black, furnace black or gas black process and have BET specific surface areas of 20 to 200 $m^2/g$, for example, SAF, ISAF, HAF, FEF or GPF carbon blacks;

or rubber gels, preferably those based on polybutadiene, butadiene/styrene copolymers, butadiene/acrylonitrile copolymers and polychloroprene.

Curing of Ionomers

The presence of the pendant vinyl groups makes the ionomers according to the present invention suitable for self and peroxide curing, particularly the ionomers comprising polymers which do not have high levels of residual multiolefin content previously thought necessary to allow self and peroxide curing without undue chain scission and molecular weight degradation.

Curing can be effected by providing conditions suitable for self and peroxide curing. In one embodiment the curing is achieved by heating the ionomers of the present invention at a suitable curing temperature.

In one embodiment the curing is achieved by heating the ionomers of the present invention at a suitable curing temperature in the presence of a peroxide curing agent.

In one embodiment, the curing temperature is in about 80 to about 250° C. In one embodiment, the curing temperature is about 100 to 200° C. In one embodiment, the curing temperature is about 120 to 180° C.

Peroxide based curing systems suitable for use in the present invention comprises a peroxide curing agent, for example, dicumyl peroxide, di-tert-butyl peroxide, benzoyl peroxide, 2,2'-bis(tert.-butylperoxy) diisopropylbenzene (Vulcup® 40KE), benzoyl peroxide, 2,5-dimethyl-2,5-di (tert-butylperoxy)-hexyne-3, 2,5-dimethyl-2,5-di(benzoylperoxy)hexane, (2,5-bis(tert.-butylperoxy)-2,5-dimethyl hexane and the like. One such peroxide curing agent comprises dicumyl peroxide and is commercially available under the name DiCup 40C™.

In one embodiment, the peroxide curing agent is used in an amount of 0.01 to 7 parts per hundred parts of rubber (phr). In another embodiment, the peroxide curing agent is used in an amount of 0.1 to 6 phr. In yet another embodiment, the peroxide curing agent is used in an amount of about 0.2 to 1.5 phr. In yet another embodiment, the peroxide curing agent is used in an amount of about 0.3 to 1.2 phr.

Peroxide curing co-agents can also be used in the present invention. Suitable peroxide curing co-agents include, for example, triallyl isocyanurate (TAIC), commercially available under the name DIAK 7™ from DuPont, N,N'-m-phenylene dimaleimide, known as HVA-2™ (DuPont Dow), triallyl cyanurate (TAC) or liquid polybutadiene known as Ricon D 153™ (supplied by Ricon Resins). Peroxide curing co-agents may be used in amounts equivalent to those of the peroxide curing agent, or less.

In some embodiments of the present invention, stabilizers, anti-oxidants, tackifiers, and/or other additives as known to those of skill in the art may also be added in the usual way and in the normal amounts.

Additionally, fillers, curing agents, and/or other additives may be added to the ionomer.

In embodiments where the composition includes the ionomer, fillers, curing agents, and/or other additives, the ingredients may be compounded together using conventional compounding techniques. Suitable compounding techniques include, for example, mixing the ingredients of the composite together using, for example, an internal mixer, such as a Banbury mixer, a miniature internal mixer, such as a Haake or Brabender mixer, or a two roll mill mixer. An extruder also provides good mixing, and permits shorter mixing times. It is possible to carry out the mixing in two or more stages, and the mixing can be done in different apparatus, for example one stage in an internal mixer and one stage in an extruder. For further information on compounding techniques, see Encyclopedia of Polymer Science and Engineering, Vol. 4, p. 66 et seq. (Compounding). Other techniques, as known to those of skill in the art, are further suitable for compounding.

In one embodiment of the process for producing peroxide cured polymers, it is desirable to first admix the nucleophile comprising a pendant vinyl group with the halogenated copolymer to form the ionomer, then to peroxide cure the ionomer by admixing it with a peroxide curing agent. In other embodiments, it is desirable to form peroxide cured compounds by admixing the halogenated copolymer with both the nucleophile comprising the pendant vinyl group and the peroxide curing agent, to thereby form the ionomer in situ during curing of the compound. This process is simpler from a process point of view, in that it requires only a single step to lead to enhanced states of peroxide cure of halogenated copolymers such as grades with insufficient diene levels in the backbone to otherwise permit peroxide curability. However, the in situ process can also be used with halogenated copolymer grades having elevated levels of multiolefins in the backbone, in order to produce cured polymers having desirably elevated cure states and short cure times. Cured compounds produced in situ desirably have at least comparable cure states, and may have enhanced cure states, as compared with compounds produced in a multi-step process.

In one aspect, the present invention relates to the cured polymer and articles comprising the ionomer as defined and described above.

The invention will now be described with reference to specific examples. It will be understood that the following examples are intended to describe embodiments of the invention and are not intended to limit the invention in any way.

Equipment

Rheometry profiles were obtained using a Moving Die Rheometer (MDR) at temperatures between 160° C. and 180° C. with a frequency of 1.7 Hz (1° arc) according to ASTM 5289. The tc90 value was subsequently used to determine test specific cure times. Stress strain samples were prepared by curing a 2 mm thick macro sheet at temperatures between 160° C. and 180° C. for tc90+5 minutes, after which Die C dumbbells were dyed out. The test was conducted at about 23° C. according to ASTM D-412 Method A. Hardness (Shore A2) values were determined using an A-scale durometer as described in ASTM 2240.

Materials

All reagents, unless otherwise specified, were used as received from Sigma-Aldrich (Oakville, Ontario). BB2030™ (LANXESS Bromobutyl 2030, LANXESS Inc.), RB301™ (LANXESS Butyl 301), Di-Cup 40C™ i.e., Dicumyl peroxide (Struktol) and "Trigonox 101-45B-PD" were used as received from their respective suppliers. Diphenylphosphinostyrene (DPPS) from Sigma-Aldrich and Hokko Chemical industry Company Ltd. (Tokyo, Japan) were both used as received from the suppliers.

BIMS1, BIMS2 and BIMS3 are brominated copolymers of isobutylene and methyl styrene. BIMS1 has styrene content of 5%, a bromide content of 0.5%, and a Mooney viscosity of 45. BIMS2 has styrene content of about 5%, a bromide content of about 0.75% and a Mooney viscosity of 35. BIMS3 has styrene content of about 7%, a bromide content of about 1.2%, and a Mooney viscosity of 45.

RB70™ is butyl rubber with an isoprene content of 6.9 mol %, a divinylbenzene content of 0.1 mol %, and a Mooney viscosity of 40.

SBB is a starch branched polymer of halogenated butyl rubber containing isobutene, isoprene and additionally a styrene-butadiene-styrene triblock polymer as branching agent. The bromine content of this polymer was 2.4% and the Mooney viscosity was 32.

Mixing Procedure 1

The polymer (or previously made compound) was added to a room temperature two-roll mill and was allowed to run for a short period of time before adding the other ingredients. All ingredients were added on the mill and the resulting compound was subjected to a minimum of 6 three-quarter cuts and 6 endwise passes to ensure adequate dispersion of ingredients. For examples where the compound was split to mix another example the scale was approximately 130 g per batch and for compounds that were not split the scale was approximately 65 g.

Mixing Procedure 2

The polymer was added to a Brabender miniature internal mixer at 130° C. and 60 rpm. The rubber was allowed to mix alone for a short period of time before adding the other ingredients. All ingredients, not including peroxide, were added in the mixer and the compound was allowed to mix for 7 to 10 minutes. The peroxide was added to the compounds on a room temperature two-roll mill. After peroxide addition the compound was refined with a minimum of 6 three-quarter cuts and 6 endwise passes. For examples where the compound was split to mix another example the scale was approximately 130 g per batch and for compounds that were not split the scale was approximately 65 g.

Mixing Procedure 3

The polymer, filler, and TPP (if applicable) were added to a Brabender miniature internal mixer at 60° C. and 60 rpm. The rubber was allowed to mix alone for a short period of time before adding the other ingredients. The compound was allowed to mix for approximately 4 minutes. The DPPS and peroxide, where applicable, were added to the mix on a room temperature two-roll mill. After ingredient addition the compound was refined with a minimum of 6 three-quarter cuts and 6 endwise passes. For examples where the compound was split to mix another example the scale was approximately 130 g per batch and for compounds that were not split the scale was approximately 65 g.

Cure Temperatures

Unless stated otherwise, a cure temperature of about 170° C. was used. In DiCup 40C containing compositions about 170° C. was used as cure temperature. In Trigonox 101-45B-PD containing compositions about 180° C. was used.

EXAMPLES

Following the general mixing procedures discussed above, various polymeric mixtures and ionomers were prepared as shown in Tables 1 to 14, and cured in the presence and absence of peroxide curing agents, and the tensile properties were determined as described below.

TABLE 1

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| RB301 ™ | | | | | | | | | | 100 | |
| BB2030 ™ | 100 | 100 | 100 | 100 | | 100 | | 100 | | | |
| RB70 ™ | | | | | | | | | | | 10 |
| Example 3 | | | | | 104.7 | | | | | | |
| Example 6 | | | | | | | 105.1 | | | | |
| Example 7 | | | | | | | | | 105.1 | | |
| TPP | | 4.7 | 4.7 | 4.7 | | | | | | | |
| DPPS | | | | | | 5.1 | | 5.1 | 5.1 | 5.1 | 5.1 |
| Di-Cup 40C ™ | 1 | | | 1 | 1 | | | 1 | 1 | 1 | 1 |
| Mixing Procedure | 1 | 1 | 2 | 1 | 1 | 1 | 2 | 1 | 2 | 1 | 1 |
| $M_H$ | 2.77 | 2.68 | 1.54 | 2.79 | 1.47 | 7.63 | 11.00 | 12.84 | 10.72 | 1.11 | 1.50 |
| $M_H$-$M_L$ | 1.19 | 1.36 | 0.23 | 1.45 | 0.12 | 6.24 | 6.27 | 11.37 | 6.24 | 0.01 | 0.44 |
| t'90 (min) | 3.51 | 4.65 | 23.18 | 5.11 | 26.10 | 23.61 | 6.27 | 7.59 | 4.48 | 29.89 | 1.60 |
| Ultimate Tensile (MPa) | N/A | N/A | N/A | N/A | N/A | 3.32 | N/A | 2.56 | N/A | N/A | N/A |

TABLE 1-continued

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Ultimate Elongation (%) | N/A | N/A | N/A | N/A | N/A | 342.1 | N/A | 150.3 | N/A | N/A | N/A |
| M100 | N/A | N/A | N/A | N/A | N/A | 0.78 | N/A | 1.34 | N/A | N/A | N/A |
| M300 | N/A | N/A | N/A | N/A | N/A | 2.57 | N/A | N/A | N/A | N/A | N/A |

As shown in Table 1: Example 1 (BB2030™+Dicumyl peroxide) shows marginal peroxide curability ($M_H$=2.77 dNm.). Example 2 (BB2030™+triphenylphosphine or TPP) pre-mixed on a room temperature (RT) mill) shows an increase in torque after 5 minutes, suggesting ionomer formation. Example 3 (BB2030™+TPP reacted in a mixer) shows no increase in torque, indicating that no further reaction occurs under heat after the ionomer is formed. Examples 4 and 5 show no increase in torque, indicating that the TPP ionomer is not peroxide curable. In comparison, Examples 6 and 7 (BB2030™+Diphenylphosphinostyrene or DPPS) show a significant increase in torque over time ($M_H$=7.63 dNm and $M_H$=11.00 dNm) with a marching modulus, indicating both formation of the ionomer as well as radical crosslinking through the vinyl group on the styrene.

Peroxide curing of the pre-formed ionomer (Example 9) resulted in a high initial torque (6.24 dNm), fast t'90 (4.48 min), high $M_H$ (10.72 dNm) and slight reversion. Example 8 illustrates the differences observed when DPPS is utilized as an additive (the DPPS and peroxide are added on a RT mill). This compound shows a slower t'90 (7.59 min), a steady state of cure and a comparable $M_H$ (12.84 dNm) indicating that the ionomer is formed in situ.

Examples 10 and 11 relate to RB301™ and TP RB75™, which cannot form an ionomer due to the absence of allylic halide. The resulting MDR curves show no increase in torque, and severe reversion for RB301, confirming absence of ionomer formation.

TABLE 2

| | Example | | | |
|---|---|---|---|---|
| | 12 | 13 | 14 | 15 |
| BB2030 ™ | 100 | | 100 | |
| Example 12 | | 101.3 | | |
| Example 13 | | | | 101.3 |
| DPPS | 1.3 | | 1.3 | |
| Di-Cup 40C ™ | | | 1 | 1 |
| Mixing Procedure | 1 | 2 | 1 | 2 |
| $M_H$ | 3.55 | 2.55 | 4.73 | 4.46 |
| $M_H - M_L$ | 2.05 | 0.77 | 3.18 | 2.36 |
| t'90 (min) | 9.03 | 18.76 | 4.72 | 1.47 |
| Ultimate Tensile (MPa) | 1.53 | 1.97 | 1.44 | 1.95 |
| Ultimate Elongation (%) | 660.9 | 913.5 | 303.5 | 301.2 |
| M100 | 0.41 | 0.4 | 0.46 | 0.56 |
| M300 | 0.79 | 0.78 | 1.41 | 2.18 |

Examples 12 to 14 relate to variation in the amount of DPPS used in the ionomer preparation.

A decreased level of DPPS (Examples 12, 13) results in compounds with lower state of cure. However, comparison of the MDR curves of lower DPPS peroxide cured compounds (pre-formed ionomer (Example 13) vs. ionomer formed in situ (Example 12) shows the same trend as the high DPPS analogues described above with comparable $M_H$ values.

Examples 12, 14 and 15 show a cure behavior and physical properties that is commensurate with crosslinked butyl rubber.

TABLE 3

| | Example | | | | |
|---|---|---|---|---|---|
| | 16 | 17 | 18 | 19 | 20 |
| BB2030 ™ | 100 | 100 | 100 | 100 | 100 |
| DPPS | 5.1 | 5.1 | 5.1 | 1.3 | 5.1 |
| Di-Cup 40C ™ | 0.05 | 0.1 | 3 | 3 | 7 |
| Mixing Procedure | 1 | 1 | 1 | 1 | 1 |
| $M_H$ | 9.85 | 10.53 | 10.15 | 4.38 | 6.17 |
| $M_H - M_L$ | 8.56 | 9.20 | 8.65 | 2.78 | 4.66 |
| t'90 (min) | 17.22 | 14.22 | 6.56 | 5.11 | 2.42 |
| Ultimate Tensile (MPa) | 4.09 | 3.81 | 2.74 | 1.69 | 2.03 |
| Ultimate Elongation (%) | 271.1 | 248.1 | 168.6 | 352.4 | 224.1 |
| M100 | 0.78 | 0.83 | 1.09 | 0.4 | 0.71 |
| M300 | N/A | N/A | N/A | 1.23 | N/A |

Examples 16-20 demonstrate that very little peroxide is required for the cure of ionomers comprising DPPS. A small amount of peroxide is beneficial in that it shortens the cure time significantly. BB2030 and DPPS with no peroxide (Example 6) has a t'90 of 23.61 min vs. t'90 of 17.22 min (Example 16), 14.22 min (Example 17), and 7.59 min (Example 8), for 0.05 phr, 0.1 phr and 1 phr dicumyl peroxide respectively. The presence of excess peroxide (i.e. 7 phr, Example 20) causes a substantial decrease in torque and is not recommended.

TABLE 4

| | Example | | | | | |
|---|---|---|---|---|---|---|
| | 21 | 22 | 23 | 24 | 25 | 26 |
| High Isoprene BIIR | 100 | 100 | | 100 | | |
| Example 22 | | | 105.1 | | | |
| Example 24 | | | | | 101.3 | 101.3 |
| DPPS | | 5.1 | | 1.3 | | |
| Di-Cup 40C ™ | 1 | | 1 | | 1 | 3 |
| Mixing Procedure | 1 | 1 | 1 | 1 | 1 | 1 |
| $M_H$ | 2.64 | 8.21 | 12.20 | 2.61 | 4.31 | 3.53 |
| $M_H - M_L$ | 1.39 | 7.10 | 11.00 | 1.42 | 3.03 | 2.25 |
| t'90 (min) | 3.54 | 23.20 | 8.11 | 15.23 | 4.97 | 3.94 |
| Ultimate Tensile (MPa) | 1.56 | 3.07 | 2.77 | N/A | 1.19 | 0.76 |
| Ultimate Elongation (%) | 955.0 | 365.5 | 184.4 | N/A | 400.8 | 364.0 |

TABLE 4-continued

| | Example | | | | | |
|---|---|---|---|---|---|---|
| | 21 | 22 | 23 | 24 | 25 | 26 |
| M100 | 0.25 | 0.75 | 1.09 | 0.32 | 0.38 | 0.36 |
| M300 | 0.34 | 2.09 | N/A | 0.41 | 0.81 | 0.84 |

Examples 22-26 demonstrate the effect of elevated levels of isoprene, wherein high isoprene BIIR (2.5 mol % isoprene, 0.8 mol % allylic bromide) was used as described in U.S. Publication No. 2007/0218296 A1, which is incorporated herein by reference. Comparison with Examples 6, 8, 12 and 14 (that based on BB2030™) show a similar state of cure ($M_H$ of 12.20 dNm for Example 23) compared to $M_H$ of 12.84 dNm for Example 8) as well as a similar cure time (t'90 of 8.11 min compared to 7.59 min.)

TABLE 5

| | Example | | | | | | |
|---|---|---|---|---|---|---|---|
| | 27 | 28 | 29 | 30 | 31 | 32 | 33 |
| BIMS1 | 100 | 100 | | | | | |
| BIMS2 | | | | 100 | | | |
| BIMS3 | | | | | | 100 | |
| Example 28 | | | 105.1 | | | | |
| Example 30 | | | | | 105.1 | | |
| Example 32 | | | | | | | 105.1 |
| DPPS | | 5.1 | | 5.1 | | 5.1 | |
| Di-Cup 40C ™ | 1 | | 1 | | 1 | | 1 |
| Mixing Procedure | 1 | 1 | 1 | 1 | 1 | 1 | 1 |
| $M_H$ | 1.77 | 13.50 | 10.32 | 16.46 | 14.33 | 16.01 | 8.55 |
| $M_H - M_L$ | 0.02 | 11.27 | 7.82 | 14.47 | 11.82 | 13.24 | 4.82 |
| t'90 (min) | 22.22 | 16.03 | 3.16 | 20.18 | 3.43 | 18.02 | 1.84 |
| Ultimate Tensile (MPa) | N/A | 4.77 | 1.8 | 2.96 | 2.36 | 2.23 | N/A |
| Ultimate Elongation (%) | N/A | 199.0 | 132.0 | 117.0 | 104.0 | 80.0 | N/A |
| M100 | N/A | 1.28 | 1.42 | 2.43 | 2.24 | N/A | N/A |
| M300 | N/A | N/A | N/A | N/A | N/A | N/A | N/A |

Examples 28-33 demonstrate the effect of ionomer formation via a benzylic bromide. Comparison with Examples 6, 8, 12 and 14 (that based on BB2030™-allylic bromide) typically shows a decreased cure state ($M_H$ of 10.32 dNm vs. $M_H$ of 12.20 dNm), but an increased cure rate (t'90 of 3.16 min for Example 29 compared to 7.59 min. for Example 8)

TABLE 6

| | Example | | | | |
|---|---|---|---|---|---|
| | 34 | 35 | 36 | 37 | 38 |
| Terpolymer | 100 | 100 | | 100 | |
| Example 35 | | | 105.1 | | |
| Example 37 | | | | | 101.3 |
| DPPS | | 5.1 | | 1.3 | |
| Di-Cup 40C ™ | 1 | | 1 | | 1 |
| Mixing Procedure | 1 | 1 | 1 | 1 | 1 |
| $M_H$ | 4.62 | 5.90 | 16.15 | 2.10 | 5.14 |
| $M_H - M_L$ | 3.35 | 4.94 | 15.2 | 1.04 | 4.13 |
| t'90 (min) | 2.88 | 23.23 | 4.72 | 4.61 | 3.62 |

TABLE 6-continued

| | Example | | | | |
|---|---|---|---|---|---|
| | 34 | 35 | 36 | 37 | 38 |
| Ultimate Tensile (MPa) | 1.65 | 2.52 | 3.15 | 0.64 | 1.79 |
| Ultimate Elongation (%) | 568.7 | 368.1 | 130.0 | 750.3 | 401.7 |
| M100 | 0.37 | 0.84 | 1.86 | 0.41 | 0.45 |
| M300 | 0.59 | 1.87 | N/A | 0.57 | 0.95 |

Examples 35-38 relate to terpolymers obtained by polymerizing isobutene, isoprene and methyl styrene, comprising 1.4 mol % of isoprene, 8.2% of methyl styrene and 0.8% brominated monomer units. Comparison with Examples 6, 8, 12 and 14 (that based on BBB2030™) shows an increased cure state ($M_H$ of 16.15 dNm (Example 34) vs. $M_H$ of 12.20 dNm(Example 8)) and increased ultimate tensile (3.15 MPa vs. 2.56 MPa.)

TABLE 7

| | Example | | | | |
|---|---|---|---|---|---|
| | 39 | 40 | 41 | 42 | 43 |
| SBB 6222 | 100 | 100 | | 100 | |
| Example 40 | | | 105.1 | | |
| Example 42 | | | | | 101.3 |
| DPPS | | 5.1 | | 1.3 | |
| Di-Cup 40C ™ | 1 | | 1 | | 1 |
| Mixing Procedure | 1 | 1 | 1 | 1 | 1 |
| $M_H$ | 2.45 | 5.13 | 10.96 | 2.15 | 4.07 |
| $M_H - M_L$ | 0.97 | 3.80 | 9.58 | 0.67 | 2.58 |
| t'90 (min) | 2.67 | 22.43 | 10.75 | 6.09 | 4.45 |
| Ultimate Tensile (MPa) | N/A | 2.39 | 2.68 | N/A | 1.14 |
| Ultimate Elongation (%) | N/A | 493.9 | 178.1 | N/A | 382.5 |

TABLE 7-continued

| | Example | | | | |
|---|---|---|---|---|---|
| | 39 | 40 | 41 | 42 | 43 |
| M100 | 0.24 | 0.72 | 1.2 | N/A | 0.41 |
| M300 | 0.33 | 1.57 | N/A | N/A | 0.97 |

Examples 40-43 demonstrate the effect of a branched polymer microstructure. Starbranched bromobutyl rubber in comparison with Examples 6, 8, 12 and 14 (that based on BB2030™) peroxide cure to a slightly lower degree ($M_H$ of 10.96 vs. $M_H$ of 12.20.)

TABLE 8

| | Example | |
|---|---|---|
| | 44 | 45 |
| BB2030 ™ | 100 | |
| Example 44 | | 103.8 |
| 2-vinylpyrazine | 3.8 | |
| Di-Cup 40C ™ | | 1 |
| Mixing Procedure | 1 | 1 |
| $M_H$ | 3.75 | 3.49 |
| $M_H - M_L$ | 2.25 | 1.93 |
| t'90 (min) | 22.58 | 5.39 |
| Ultimate Tensile (MPa) | 1.49 | 1.16 |
| Ultimate Elongation (%) | 879 | 605 |
| M100 | 0.32 | 0.45 |
| M300 | 0.45 | 0.54 |

TABLE 9

| | Example | |
|---|---|---|
| | 46 | 47 |
| BB2030 ™ | 100 | |
| Example 46 | | 106.1 |
| N-[3-(dimethylamino)propyl]methacrylamide | 6.1 | |
| Di-Cup 40C ™ | | 1 |
| Mixing Procedure | 1 | 1 |
| $M_H$ | 3.01 | 3.52 |
| $M_H - M_L$ | 1.29 | 1.80 |
| t'90 (min) | 5.26 | 2.62 |
| Ultimate Tensile (MPa) | N/A | 2.31 |
| Ultimate Elongation (%) | N/A | 441 |
| M100 | N/A | 0.38 |
| M300 | N/A | 0.88 |

Examples 44-47 demonstrate ionomers formed via alternative nucleophiles. In comparison with Example 8 (that with DPPS), these nucleophiles show a greatly reduced cure state (~3.5 MPa vs. 12.20 MPa.)

TABLE 10

| | Example | | | |
|---|---|---|---|---|
| | 48 | 49 | 50 | 51 |
| BB2030 ™ | 100 | | 100 | |
| Example 47 | | 104.9 | | |
| Example 49 | | | | 105.4 |
| tri(p-tolyl)phosphine | | | 5.4 | |

TABLE 10-continued

| | Example | | | |
|---|---|---|---|---|
| | 48 | 49 | 50 | 51 |
| diphenyl(p-tolyl)phosphine | 4.9 | | | |
| Di-Cup 40C ™ | | 1 | | 1.1 |
| Mixing Procedure | 1 | 1 | 1 | 1 |
| $M_H$ | 2.71 | 2.50 | 2.37 | 2.31 |
| $M_H - M_L$ | 1.37 | 1.21 | 0.96 | 0.93 |
| t'90 (min) | 3.86 | 2.49 | 2.99 | 1.71 |
| Ultimate Tensile (MPa) | N/A | N/A | N/A | N/A |
| Ultimate Elongation (%) | N/A | N/A | N/A | N/A |
| M100 | N/A | N/A | N/A | N/A |
| M300 | N/A | N/A | N/A | N/A |

Examples 48-51 demonstrate that the allyl or vinyl group is necessary for peroxide cure to occur. These tolyl-functionalized phosphine nucleophiles form ionomer, but do not peroxide cure.

TABLE 11

| | Example | | |
|---|---|---|---|
| | 52 | 53 | 54 |
| BB2030 ™ | 100 | 100 | 100 |
| DPPS | 5.1 | 1.3 | 1.3 |
| TPP | | | 3.7 |
| Trigonox 101-45B-PD ™ | 0.3 | 0.3 | 0.3 |
| Mixing Procedure | 1 | 1 | 1 |
| $M_H$ | 13.21 | 4.82 | 4.01 |
| $M_H - M_L$ | 11.93 | 3.48 | 2.81 |
| t'90 (min) | 5.12 | 3.40 | 7.28 |
| Ultimate Tensile (MPa) | 3.51 | 1.46 | 2.46 |
| Ultimate Elongation (%) | 169.6 | 375.8 | 603.1 |
| M100 | 1.17 | 0.45 | 0.54 |
| M300 | N/A | 1.13 | 1.12 |

Examples 52-54 show the use of different peroxide types with peroxide curable ionomer. Equimolar amounts of Trigonox-101 and dicumyl peroxide demonstrate a similar crosslink density.

TABLE 12

| | Example | | | | |
|---|---|---|---|---|---|
| | 55 | 56 | 57 | 58 | 59 |
| BB2030 ™ | 100 | | 100 | 100 | 100 |
| DPPS | 1.3 | | 1.3 | | |
| TPP | | | | 4.7 | |
| Example 56 | | 161.3 | | | |
| HiSil 532EP | 60 | | 60 | 60 | 60 |
| Di-Cup 40C ™ | | 1 | 3 | | 1 |
| Mixing Procedure | 3 | 1 | 3 | 3 | 3 |
| $M_H$ | 26.32 | 24.09 | 20.24 | 11.60 | 15.35 |
| $M_H - M_L$ | 19.07 | 17.39 | 14.32 | 5.03 | 8.51 |
| t'90 (min) | 8.69 | 14.66 | 15.37 | 2.22 | 2.84 |
| Ultimate Tensile (MPa) | 7.42 | 8.53 | 6.53 | N/A | N/A |
| Ultimate Elongation (%) | 553.5 | 560.0 | 424.1 | N/A | N/A |
| M100 | 1.75 | 1.68 | 1.93 | N/A | N/A |
| M300 | 4.33 | 4.68 | 5.32 | N/A | N/A |

Examples 55-65 demonstrate the properties that can be obtained by the use of fillers in peroxide curable ionomers. MH values of up to 35.34 and ultimate tensile of 13.08 MPa can be achieved in cured filled compounds. These properties can be tailored to specific applications by altering of the recipes.

TABLE 13

|  | Example | | | | | |
| --- | --- | --- | --- | --- | --- | --- |
|  | 60 | 61 | 62 | 63 | 64 | 65 |
| BB2030 ™ |  |  |  |  |  |  |
| DPPS | 5.1 | 1.3 | 5.1 | 1.3 |  |  |
| TPP |  |  |  |  | 4.7 |  |
| IRB#7 | 50 | 50 | 50 | 50 | 50 | 50 |
| Di-Cup 40C ™ | 3 | 3 | 3 | 3 | 3 | 1 |
| Mixing Procedure | 2 | 2 | 3 | 3 | 3 | 3 |
| $M_H$ | 25.12 | 9.37 | 35.34 | 11.38 | 8.66 | 8.05 |
| $M_H$-$M_L$ | 8.76 | 3.33 | 31.23 | 7.02 | 4.38 | 3.93 |
| t'90 (min) | 2.69 | 3.66 | 10.67 | 7.26 | 2.05 | 14.83 |
| Ultimate Tensile (MPa) | N/A | 5.82 | 13.08 | 6.48 | 11.88 | 8.69 |
| Ultimate Elongation (%) | N/A | 309.0 | 125.8 | 378.5 | 551.0 | 626.5 |
| M100 | N/A | 1.55 | 9.62 | 1.62 | 1.659 | 1.053 |
| M300 | N/A | 5.82 | N/A | 5.24 | 5.949 | 2.917 |

TABLE 14

|  | Example | |
| --- | --- | --- |
|  | 66 | 67 |
| BB2030 ™ | 100 | 100 |
| DPPS | 5.1 | 1.3 |
| HVA-2 ™ | 1 | 1 |
| Di-Cup 40C ™ | 1 | 1 |
| Mixing Procedure | 1 | 1 |
| $M_H$ | 12.42 | 4.28 |
| $M_H - M_L$ | 10.87 | 2.64 |
| t'90 (min) | 7.50 | 3.92 |
| Ultimate Tensile (MPa) | 2.76 | 1.04 |
| Ultimate Elongation (%) | 167.8 | 326.3 |
| M100 | 1.08 | 0.427 |
| M300 | N/A | 1.151 |

Examples 66-67 demonstrate the effect of coagent on peroxide curable ionomer. Although the torque in the MDR is not altered by the addition of coagent, it can alter the physical properties i.e. elongation of the compounds. These recipes can be altered and different coagents may provide an improvement in properties.

|  |  | Example | | | |
| --- | --- | --- | --- | --- | --- |
|  |  | 68 | 69 | 70 | 71 |
|  | BB2030 | 100 | 100 | 100 | 100 |
|  | DPPS | 5.0 | 5.0 | 5.0 | 5.0 |
|  | HVA-2 |  | 3.0 |  | 3.0 |
|  | Trigonox 101-45B-PD | 0.1 | 0.1 | 0.3 | 0.3 |
| Temperature: 160° C. | $M_H$ (dNm) | 11.08 | 14.41 | 15.56 | 15.42 |
|  | $M_H$-$M_L$ (dNm) | 9.62 | 12.73 | 14.05 | 13.72 |
|  | $t_{90}$ (min) | 35.67 | 29.64 | 22.65 | 19.45 |
| Temperature: 180° C. | $M_H$ (dNm) | 10.24 | 11.83 | 12.85 | 12.53 |
|  | $M_H$-$M_L$ (dNm) | 8.97 | 10.31 | 11.53 | 11.01 |
|  | $t_{90}$ (min) | 15.84 | 6.50 | 5.47 | 5.36 |
| Temperature: 200° C. | $M_H$ (dNm) | 8.41 | 8.88 | 9.89 | 9.02 |
|  | $M_H$-$M_L$ (dNm) | 7.20 | 7.44 | 8.57 | 7.51 |
|  | $t_{90}$ (min) | 7.09 | 2.48 | 2.54 | 2.29 |
| Rubber cured at 200° C. | $t_{cure}$ (min.) | 10 | 7 | 7 | 7 |
|  | $T_{cure}$ (° C.) | 200 | 200 | 200 | 200 |
|  | Ultimate Tensile (MPa) | 2.43 | 3.72 | 2.23 | 3.62 |
|  | Ultimate Elongation (%) | 246 | 222 | 183 | 224 |
|  | M100 (MPa) | 0.78 | 0.94 | 0.89 | 0.86 |

Examples 68-71 show that crosslinked rubber is resulting at temperatures between 160 and 200° C.

Extractions in Toluene

Some of the above examples were extracted in toluene to demonstrate crosslinking of the polymer. Small masses of the cured compounds were weighed (approximately 0.3 g) and placed in glass vials with caps. To the vials approximately 5 mL of toluene was added and the samples were allowed to mix on a shaker for over 72 hours. The samples were then decanted and the swollen rubber, if it had not dissolved, was weighed and the mass was recorded. The swollen rubber was then placed in a vacuum oven at 60-70° C. overnight to dry the sample of any solvent. The dried sample was then weighed and the mass was recorded. A rubber that swells in organic solvent is indicative of a crosslinked polymer.

TABLE 15

| Sample | Observation | % Swell | % Loss |
| --- | --- | --- | --- |
| Example 1 | swollen | 601.2 | 10.7 |
| Example 2 | dissolved | N/A | N/A |
| Example 6 | swollen | 363.8 | 6.1 |
| Example 8 | swollen | 264.9 | 4.6 |
| Example 12 | swollen | 718.6 | 12.2 |
| Example 14 | swollen | 405.5 | 8.0 |

Calculations:

% swell=(swollen mass/dried mass)*100%

% loss=[(initial mass−dried mass)/initial mass]*100%

All documents cited in the Detailed Description of the invention are, in relevant part, incorporated herein by reference; the citation of any document is not to be construed as an admission that it is prior art with respect to the present invention.

Although the invention has been described in detail in the foregoing for purposes of illustration, it is understood that such detail is solely for that purpose and that variations can be made therein by those skilled in the art without departing from the spirit and scope of the invention except as it may be limited by the claims.

What is claimed:

1. An ionomer comprising a reaction product of the reaction between a halogenated star branched isoolefin copolymer and at least one phosphorus based nucleophile comprising at least one pendant vinyl group.

2. The ionomer of claim 1, wherein the halogenated star branched isoolefin copolymer comprises halobutyl rubber.

3. The ionomer of claim 1, wherein the halogenated star branched isoolefin copolymer comprises a copolymer of isobutylene and p-methyl styrene, wherein one or more repeating units derived from the p-methyl styrene have a benzylic halogen group.

4. The ionomer of claim 1, wherein the halogenated star branched isoolefin copolymer comprises a terpolymer of isobutylene, isoprene and p-methyl styrene, wherein one or more repeating units derived from the isoprene have an allylic halogen moiety, and/or one or more repeating units derived from the p-methyl styrene have a benzylic halogen group.

5. The ionomer of claim 1, wherein the halogenated star branched isoolefin copolymer comprises repeating units derived from at least one isoolefin monomer, and repeating units derived from one or more multiolefin monomers, one or more alkyl substituted aromatic vinyl monomers or a mixture thereof.

6. The ionomer of claim 5, wherein the halogenated star branched isoolefin copolymer comprises at least one allylic halogen moiety, or at least one halo alkyl moiety or both.

7. The ionomer of claim 5, wherein the halogenated star branched isoolefin copolymer comprises repeating units derived from the at least one isoolefin monomer and repeating units derived from the one or more multiolefin monomers.

8. The ionomer of claim 7, wherein one or more of the repeating units derived from the one or more multiolefin monomers comprise an allylic halogen moiety.

9. The ionomer of claim 8, wherein the one or more multiolefin monomers are selected from C4-C16 conjugated diolefins.

10. The ionomer of claim 9, wherein the conjugated dioiefin is isoprene.

11. The ionomer of claim 5, wherein the halogenated star branched isoolefin copolymer comprises repeating units derived from the at least one isoolefin and repeating units derived from the one or more alkyl substituted aromatic vinyl monomers.

12. The ionomer of claim 11, wherein one or more of the repeating units derived from the one or more alkyl substituted aromatic vinyl monomers comprise a halo alkyl moiety.

13. The ionomer of claim 5, wherein the halogenated star branched isoolefin copolymer comprises repeating units derived from the at least one isoolefin, repeating units derived from the one or more multiolefin monomers, and repeating units derived from the one or more alkyl substituted aromatic vinyl monomers.

14. The ionomer of claim 13, wherein one or more repeating units derived from the one or more muitiolefin monomers comprise an allylic halogen moiety and/or one or more repeating units derived from the one or more alkyl substituted aromatic vinyl monomers comprise a halo alkyl moiety.

15. The ionomer of any one of claims 11 to 14, wherein the alkyl substituted aromatic vinyl monomer has an aromatic group selected from a group that includes benzene, naphthalene, anthracene, phenanthrene and biphenyl.

16. The ionomer of any one of claims 11 to 14, wherein the alkyl substituted aromatic vinyl monomer is $C_1$-$C_4$ alkyl substituted styrene.

17. The ionomer of claim 16, wherein the alkyl substituted aromatic vinyl monomer is o-methyl styrene, p-methyl styrene, or m-methyl styrene.

18. The ionomer of claim 5, wherein the isoolefin monomer comprises a $C_4$ to $C_8$ isomonoolefin monomer.

19. The ionomer of claim 18, wherein the isomonoolefin monomer comprises isobutylene.

20. The ionomer of claim 5, wherein the ionomer comprises from about 0.2 to about 20 mol % of the repeating units derived from the one or more multiolefin monomers.

21. The ionomer of claim 5, wherein the ionomer comprises from about 0.5 to about 2.5 mol % of the repeating units derived from the one or more multiolefin monomers.

22. The ionomer of claim 5, wherein the ionomer comprises from about 3.0 to about 8.0 mol % of the repeating units derived from the one or more multiolefin monomer.

23. The ionomer of claim 5, wherein the phosphorus based nucleophile has the formula:

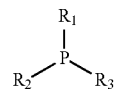

wherein $R_1$, $R_2$ and $R_3$ are independently:
  a linear or branched $C_1$-$C_{18}$ is alkyl group optionally comprising one or more hetero atoms, one or more carbonyl groups or combinations thereof; C6 to C10 aryl; C3-C6 heteroaryl; C3-C6 cycloalkyl; C3-C6 heterocycloalkyl; or combinations thereof; and
  at least one of $R_1$, $R_2$ and $R_3$ contains a pendant vinyl group.

24. The ionomer of claim 23, wherein at least one of $R_1$, $R_2$ and $R_3$ is a linear or branched $C_1$-$C_{18}$ alkyl group having a pendent vinyl group represented by the formula —CH=$CH_2$.

25. The ionomer of claim 23, wherein at least one of $R_1$, $R_2$ and $R_3$ is:
  a linear or branched $C_1$-$C_{18}$ alkyl group optionally substituted with —C(O)—C(=CR'R")$R_4$, or —C(O)$R_4$, wherein R', R" and $R_4$ are independently $C_1$-$C_6$ alkyl or H, or
  a $C_6$ to $C_{10}$ aryl group.

26. The ionomer of claim 23, wherein at least one of $R_1$, $R_2$ and $R_3$ is a $C_6$ to $C_{10}$ aryl substituted with a pendent vinyl group or substituted with a linear or branched $C_1$-$C_{18}$ alkyl group having a pendant vinyl group, wherein the pendant vinyl group is represented by the formula —CH=$CH_2$.

27. The ionomer of claim 23, wherein the phosphorous based nucleophile is selected from the group consisting of diphenylphosphinostyrene (DPPS), allyldiphenylphosphine, diallylphenylphosphine, diphenylvinylphosphine, triallylphosphine, and mixtures thereof.

28. The ionomer of claim 23, wherein the phosphorous based nucleophile is diphenylphosphinostyrene (DPPS).

29. A process for preparing an ionomer, the process comprising the steps of:
  providing a halogenated star branched isoolefin copolymer;
  providing at least one phosphorus based nucleophile comprising at least one pendent vinyl group; and
  reacting the halogen moiety of the halogenated star branched copolymer with the nucleophile to form the ionomer.

30. The process according to claim 29, wherein the halogenated star branched isoolefin copolymer comprises repeating units derived from at least one isoolefin monomer, and repeating units derived from one or more multioiefin monomers, one or more alkyl substituted aromatic vinyl monomers, or a mixture thereof.

31. The process according to claim 29, further comprising reacting about 1 to 5 molar equivalents of the phosphorus based nuoleophile with the halogenated star branched isoolefin copolymer based on a total molar amount of halogen present in the halogenated star branched isoolefin copolymer.

32. A process for preparing a cured polymer, the process comprising the steps of:
providing a halogenated star branched isoolefin copolymer;
providing at least one phosphorus based nucleophile comprising at least one pendant vinyl group;
reacting the halogen moiety of the halogenated copolymer with the nucleophile to form an ionomer; and
curing the ionomer by heating at a suitable curing temperature.

33. The process of claim 32, wherein the curing temperature is about 80° C. to about 250° C.

34. The process of claim 32 or 33, wherein the curing step further comprises adding a peroxide curing agent.

35. The process of claim 34, wherein the process further comprises forming the ionomer prior to the curing step.

36. The process of claim 34, wherein the process further comprises forming the ionomer during the curing step.

37. The process according to claim 34, wherein the peroxide curing agent comprises dicumyl peroxide, di-tert-butyl peroxide, benzoyl peroxide, 2,2'-bis (tert-butylperoxy) diisopropylbenzene, benzoyl peroxide, 2,5-dimethyl-2,5-di(terr-butylperoxy)-hexyne-3, 2,5-dimethyl-2,5-di(benzoylperoxy)hexane, or (2,5-bis(tert-butylperoxy)-2,5-dimethyl hexane.

38. The process according to claim 34, wherein adding the peroxide curing agent comprises adding 0.01 to 7 phr of the peroxide curing agent.

39. The process according to claim 34, further comprising reacting about 1 to 5 molar equivalents of the phosphorus based nucleophile with the halogenated star branched isoolefin copolymer based on a total molar amount of halogen present in the halogenated star branched isoolefin copolymer.

40. The process according to claim 34, wherein the process further comprises admixing a peroxide curing co-agent with the peroxide curing agent and the ionomer.

41. The process according to claim 40, wherein the co-agent comprises triallyl isocyanurate (TAIC), N,N'-m-phenylene dimaleimide, triallyl cyanurate (TAC) or liquid polybutadiene.

42. The process according to claim 34 wherein the ionomer comprises total unsaturation of the copolymer and the pendant vinyl group in an amount greater than or equal to 1.0 mol %.

* * * * *